UNITED STATES PATENT OFFICE 2,239,012

COMPOUNDS OF THE CYCLOPENTANOPOLY-HYDROPHENANTHRENE SERIES AND PROCESS OF MAKING SAME

Karl Miescher, Riehen, and Albert Wettstein, Basel, Switzerland, assignors, by mesne assignments, to Ciba Pharmaceutical Products, Incorporated, Summit, N. J., a corporation of New Jersey No Drawing. Application July 5, 1938, Serial No. 217,623. In Switzerland July 17, 1937

16 Claims. (Cl. 260—397)

By this invention polyhydroxy compounds of the cyclopentanopolyhydrophenanthrene series or derivatives thereof are made by treating with a reducing agent a compound of the said series containing in a side chain a free or substituted α-hydroxy- or α-keton-aldehyde-, -ketone- or -carboxylic acid group and if required subjecting the product thus obtained to saponification and/or esterification or etherification.

The α-hydroxy-groups in the parent materials may be free, esterified or etherified and the carboxylic acids may be present as such or in the form of their halides, esters, amides or anhydrides. The α-hydroxy- or α-keto-aldehyde, -ketone- or carboxylic acid groups may moreover be connected directly with the cyclic nucleus, for example in position 17 or 3, or they may be separated from it for example by one or more carbon atoms. Such compounds are obtainable for example by scission of corresponding keto- or hydroxy-acetylene or -ethylene compounds, or by the action of selenium dioxide on methylene or methyl groups in α-position to a carbonyl group in a side chain or by replacement of the diazo- or halogen group in α-dihalogen ketones or diazoketones by oxygen or water. In addition to the groups hereinbefore named the parent materials may naturally contain further substituents in the nucleus and in the side chains, such as substituted or unsubstituted hydroxyl, carbinol, carboxyl, amino or hydrocarbon groups, also halogen atoms, ketogroups and particulary also their enol derivatives such as enol-esters or enol-ethers. In the latter case enol groups present after the reaction may be reconverted into keto-groups. As parent materials for the invention there may be named particularly for example compounds of the saturated and unsaturated aetio-cholane, oestrone or hydro-oestrone series containing in positions 3, 11, 12 and/or 17 oxy groups, substituted oxy-groups or keto-groups and having in 17- and/or 3-position for example the following groups:

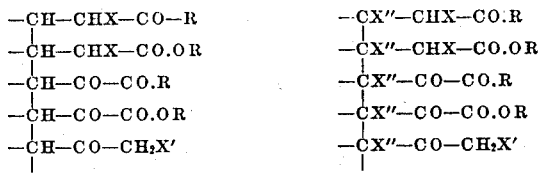

These compounds yield products containing groups of the following kind:

In the foregoing formulae R represents for example hydrogen or a substituted or unsubstituted hydrocarbon residue and X, X' and X'' may represent free, esterified or etherified hydroxy groups. Any desired stereo-isomers may of course be used as parent material, especially compounds which differ in the configuration at carbon atoms 3, 5, 9, 11, 12, 17 and/or 20.

A large number of reducing agents is available for use in carrying out the invention, for example metals such as alkali metals, zinc, iron, magnesium, copper or alloys thereof in presence of for example alcohols, moist ethers, dilute acids or alkalies, organic acids such as glacial acetic acid or of solutions of alkali salts of organic acids and ethers. There may also be used for example an alkali-ammonium, an amalgam such as an alkali-, aluminium- or magnesium-amalgam, in the presence of an acid or an alkali, or aluminium-isopropylate or -isobutylate or the like in presence of an alcohol. The reduction may also be performed for example electrolytically or with hydrogen catalytically activated by for example nickel, cobalt, palladium or platinum or it may be performed by biochemical means. Finally, there may be used organo-metallic compounds, especially those which have a tendency to form unsaturated compounds.

Further atoms groupings may also undergo reduction simultaneously with the side chain groups above referred to; for example a ketogroup may be reduced to a secondary alcohol group or an α:β-unsaturated ketone may be reduced to a saturated ketone or alcohol or to an unsaturated alcohol and so on.

After the reduction or in the course of the reduction ester-groups, ether-groups or the like, especially enol-ester or enol-ether-groups in the resulting products may be saponified by the action of a hydrolyzing agent such as water or an alkaline or acid agent or a re-esterification agent. The products of the saponification may again be esterified or etherified with other acids or alcohols and/or at other places in the molecule. On the other hand free hydroxyl groups present in the original product of the reduction may be directly esterified or etherified in known manner. For esterification there may be used for example carboxylic acids such as acetic acid, propionic acid, valerianic acid, palmitic acid, crotonic acid, benzoic acid or phenylacetic acid, or a sulfonic acid such as methanesulfonic acid or toluenesulfonic acid, or a hydrohalogen acid, a phosphoric acid, a boric acid or the like, or a derivative of any of these acids such as an acid anhydride or acid halide, or a ketene. Among the ether derivatives which may be prepared may be named for example methyl, ethyl, cyclohexyl and trityl ethers.

The products obtainable by the invention, namely glycols or derivatives thereof, are compounds of therapeutic value or can be converted into such compounds. The stereo-isomers which may sometimes be produced owing to the appearance of a new centre of asymmetry at carbon atom 20 can be separated if required, for example by recrystallization; in most cases, however, this is unnecessary for the therapeutic application or further treatment of the product.

The following examples illustrate the invention, the parts being by weight:

Example 1

1 part of the 3-enol-acetate of 17:21-diacetoxy-progesterone (prepared for example from $\Delta^{5,6}$-3:17-diacetoxy-aetiocholenic acid chloride by reaction with diazo-methane, partial saponification in 3-position and then heating with acetic acid. The so obtained $\Delta^{5,6}$-17:21-diacetoxy-pregnene-3-ol-20-one is dehydrated with cyclohexanone in the presence of aluminium isopropylate to 17:21-diacetoxy-progesterone which is finally enolized with acetic acid anhydride) is heated for some time in a reflux apparatus with 20 parts of anhydrous isobutyl alcohol and 4 parts of aluminium-isobutylate. The bulk of the alcohol is then evaporated and the residue is diluted with water and extracted with ether. The ethereal solution is washed with bicarbonate solution and with water, dried and evaporated. The residue is fractionally recrystallized from dilute alcohol whereby there is obtained, besides partially saponified products, the 3-enol-acetate of $\Delta^{4,5}$-3-keto-pregnene-17:20:21-triol - 17:21 - diacetate having probably the formula

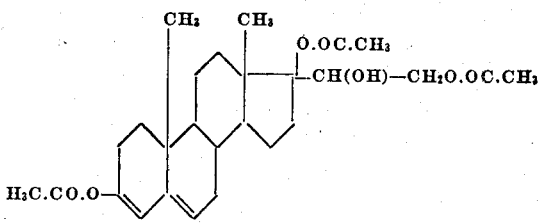

It may be saponified with alcoholic alkali-hydroxide solution of 2 per cent strength to the free $\Delta^{4,5}$-pregnenone-(3)-triol-(17:20:21) and this product may be converted into another ester, for example into the 20-21-diester. Instead of from the 3-enol-esters it is also of advantage to start from the 3-enol-ethers, for example the methyl- or ethyl-ether, and saponify the reduction products if desired with acid agents.

Instead of aluminium-isobutylate the reduction can be performed for example with aluminium-isopropylate in the presence of an alcohol such as isopropyl alcohol or cyclohexanol; or the reduction may be performed phytochemically by means of pressed yeast and a solution of cane sugar, or then catalytically by means of a little active nickel catalyst.

The same products can be obtained by starting from 17-oxy-21-oxo-progesterone (obtainable for example from $\Delta^{5,6}$-17:21-diacetoxy-pregnene-3-ol-20-one by total saponification and subsequent action of diethyl-ketone in the presence of aluminium-isopropylate) or one of its derivatives. When using a free, esterified or etherified $\Delta^{5,6}$-3:17:21-trioxy-pregnenone-(20) as starting material, there is obtained in analogous manner a $\Delta^{5,6}$-3:17:20:21-tetra-oxy-pregnene or a derivative thereof. Compounds hydroxylated in 11- or 12-position and saturated compounds, for example of the 3-epi-oxy-allo-pregnane series, can also be obtained in a completely analogous manner.

Example 2

1 part of $\Delta^{5,6}$-20:21-dioxo-pregnenol-(3) (prepared for example from $\Delta^{5,6}$-21-diazo-pregnene-3-ol-20-one by reduction with hydrogen sulfide in the presence of ammonia and subsequent saponification of the hydrazone thus obtained with a solution of sulfuric acid and glacial acetic acid) is hydrogenated in alcoholic solution in presence of a nickel-cobalt catalyst under a small overpressure. When 2 molecular proportions of hydrogen have been absorbed the catalyst is separated by filtering, the filtrate is concentrated and the product is precipitated by addition of water and extracted with ether. The ethereal solution is washed with bicarbonate solution and with water, dried and evaporated. After recrystallization there is thus obtained $\Delta^{5,6}$-3:20:21-trioxy-pregnene of the formula

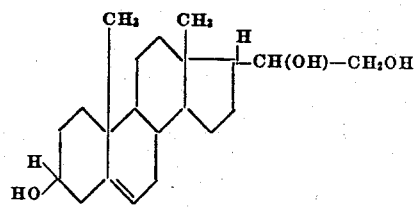

This product may now be esterified according to known methods with for example acetic acid, propionic acid, phosphoric acid or the like or it may be etherified with for example triphenylmethylcarbinol.

If the corresponding 17-oxy-compound is used as parent material (obtainable for example from $\Delta^{5,6}$-3-acetoxy-17-oxy-aetiocholenic acid chloride by reaction with diazo-methane, alkaline saponification and then oxydation) there is obtained in an analogous manner $\Delta^{5,6}$-3:17:20:21-tetroxy-pregnene.

Instead of 20:21-keto-aldehydes 20:21-keto-carboxylic acid esters or 20:21-oxycarboxylic acid esters (prepared for example from the corresponding 17-acetic acid esters by halogenation in $\alpha$-position to the substituted carboxylic acid group, saponification and if desired oxydation of the new hydroxy group) for example may be reduced for example with sodium and propyl alcohol.

What we claim is:

1. A process for the manufacture of polyhydroxy-compounds of the cyclopentanopolyhydrophenanthrene series and their derivatives, comprising treating with a reducing agent a compound of this series containing in position 17 a side chain carrying a member of the group consisting of a free, an esterified and an etherified $\alpha$-hydroxy-aldehyde-, $\alpha$-hydroxy-ketone-, $\alpha$-hydroxy-carboxylic acid-, $\alpha$-keto-aldehyde-, $\alpha$-keto-ketone- and an $\alpha$-keto-carboxylic acid-grouping.

2. A process for the manufacture of polyhydroxy-compounds of the cyclopentanopolyhydrophenanthrene series and their derivatives, comprising treating with a reducing agent and then with a hydrolyzing agent a compound of this series containing in position 17 a side chain carrying a member of the group consisting of an esterified and an etherified $\alpha$-hydroxy-aldehyde-, $\alpha$-hydroxy-ketone-, $\alpha$-hydroxy-carboxylic acid-, α-keto-aldehyde-, α-keto-ketone- and an α-keto-carboxylic acid-grouping.

3. A process for the manufacture of polyhydroxy-compounds of the cyclopentanopolyhydrophenanthrene series and their derivatives, comprising treating with a reducing agent, a hydrolyzing agent and finally with a member of the group consisting of an esterifying and an etherifying agent a compound of the said series containing in position 17 a side chain carrying a member of the group consisting of an esterified and an etherified α-hydroxy-aldehyde-, α-hydroxy-ketone-, α-hydroxy-carboxylic acid-, α-keto-aldehyde-, α-keto-ketone- and an α-keto-carboxylic acid-grouping.

4. A process for the manufacture of polyhydroxy-compounds of the cyclopentanopolyhydrophenanthrene series and their derivatives, comprising treating with a reducing agent a compound of this series containing in the nucleus members of the group consisting of keto-groups and their enol derivatives and in position 17 a side chain carrying a member of the group consisting of a free, an esterified and an etherified α-hydroxy-aldehyde-, α-hydroxy-ketone-, α-hydroxy-carboxylic acid-, α-keto-aldehyde-, α-keto-ketone- and an α-keto-carboxylic acid-grouping.

5. A process for the manufacture of polyhydroxy-compounds of the cyclopentanopolyhydrophenanthrene series and their derivatives, comprising treating with a reducing agent and then with a hydrolyzing agent a compound of this series containing in the nucleus members of the group consisting of keto-groups and their enol derivatives and in position 17 a side chain carrying a member of the group consisting of a free, an esterified and an etherified α-hydroxy-aldehyde-, α-hydroxy-ketone-, α-hydroxy-carboxylic acid-, α-keto-aldehyde-, α-keto-ketone- and an α-keto-carboxylic acid-grouping.

6. A process for the manufacture of polyhydroxy-compounds of the cyclopentanopolyhydrophenanthrene series and their derivatives, comprising treating with a reducing agent, a hydrolyzing agent and finally with a member of the group consisting of an esterifying and etherifying agent a compound of the said series containing in the nucleus members of the group consisting of keto-groups and their enol derivatives and in position 17 a side chain carrying a member of the group consisting of a free, an esterified and an etherified α-hydroxy-aldehyde-, α-hydroxy-ketone-, α-hydroxy-carboxylic acid-, α-keto-aldehyde-, α-keto-ketone- and an α-keto-carboxylic acid-grouping.

7. A process for the manufacture of polyhydroxy-compounds of the cyclopentanopolyhydrophenanthrene series and their derivatives, comprising treating with a reducing agent a compound of this series containing in 17-position a member of the group consisting of a free, an esterified and an etherified α-hydroxy-aldehyde-, α-hydroxy-ketone-, α-hydroxy-carboxylic acid-, α-keto-aldehyde-, α-keto-ketone- and an α-keto-carboxylic acid-grouping.

8. A process for the manufacture of polyhydroxy-compounds of the cyclopentanopolyhydrophenanthrene series and their derivatives, comprising treating with a reducing agent a compound of this series containing in 17-position a member of the group consisting of a free, an esterified and an etherified α-hydroxy-aldehyde-, α-hydroxy-ketone-, α-hydroxy-carboxylic acid-, α-keto-aldehyde-, α-keto-ketone- and an α-keto-carboxylic acid-grouping, and besides this containing in 17-position a member of the group consisting of a free, an esterified and an etherified hydroxyl.

9. A process for the manufacture of polyhydroxy-compounds of the cyclopentanopolyhydrophenanthrene series and their derivatives, comprising treating with a reducing agent and then with a hydrolyzing agent a compound of this series containing in 17-position a member of the group consisting of a free, an esterified and an etherified α-hydroxy-aldehyde-, α-hydroxy-ketone-, α-hydroxy-carboxylic acid-, α-keto-aldehyde-, α-keto-ketone- and an α-keto-carboxylic acid-grouping, and besides this containing in 17-position a member of the group consisting of a free, an esterified and an etherified hydroxyl.

10. A process for the manufacture of polyhydroxy-compounds of the cyclopentanopolyhydrophenanthrene series and their derivatives, comprising treating with a reducing agent, a hydrolyzing agent and finally with a member of the group consisting of an esterifying and an etherifying agent a compound of the said series containing in 17-position a member of the group consisting of a free, an esterified and an etherified α-hydroxy-aldehyde-, α-hydroxy-ketone-, α-hydroxy-carboxylic acid-, α-keto-aldehyde-, α-keto-ketone- and an α-keto-carboxylic acid-grouping, and besides this containing in 17-position a member of the group consisting of a free, an esterified and an etherified hydroxyl.

11. The compounds of the cyclopentanopolyhydrophenanthrene series containing in 17-position the side chain of the formula

wherein X and X' represent members of the group consisting of free, esterified and etherified hydroxyl groups and R stands for a member of the group consisting of hydrogen and a hydrocarbon radical.

12. The compounds of the cyclopentanopolyhydrophenanthrene series containing in 17-position the side chain of the formula

wherein X and X' represent members of the group consisting of free, esterified and etherified hydroxyl groups and R stands for a member of the group consisting of hydrogen and a hydrocarbon radical, and containing at the nuclear carbon atom carrying the said side chain a member of the group consisting of a free, an esterified and an etherified hydroxyl group.

13. Compounds of the Δ⁴,⁵-pregnenone-(3)-ol(17) series having a member of the group consisting of free, esterified and etherified hydroxyl groups in the 20 and 21 positions.

14. Compounds of the Δ⁴,⁵-pregnenone-(3)-triol-(17,20,21)-diesters-(20,21).

15. Compounds of the Δ⁵,⁶-3:20:21-trioxypregnenes.

16. Compounds of the Δ⁵,⁶-3:17:20:21-tetroxypregnenes.

KARL MIESCHER.
ALBERT WETTSTEIN.